US010611495B2

(12) United States Patent
McNeill et al.

(10) Patent No.: US 10,611,495 B2
(45) Date of Patent: Apr. 7, 2020

(54) SEA STATE ESTIMATION

(71) Applicant: Sikorsky Aircraft Corporation, Stratford, CT (US)

(72) Inventors: William McNeill, Stratford, CT (US); Brigid Blakeslee, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 97 days.

(21) Appl. No.: 15/475,406

(22) Filed: Mar. 31, 2017

(65) Prior Publication Data
US 2017/0291718 A1 Oct. 12, 2017

Related U.S. Application Data

(60) Provisional application No. 62/319,842, filed on Apr. 8, 2016.

(51) Int. Cl.
| | | |
|---|---|---|
| *B64D 45/08* | (2006.01) | |
| *G01S 17/89* | (2020.01) | |
| *G01S 17/66* | (2006.01) | |
| *G01S 17/58* | (2006.01) | |

(52) U.S. Cl.
CPC ............. *B64D 45/08* (2013.01); *G01S 17/58* (2013.01); *G01S 17/66* (2013.01); *G01S 17/89* (2013.01)

(58) Field of Classification Search
CPC .................................................... B64D 45/08
See application file for complete search history.

(56) References Cited

U.S. PATENT DOCUMENTS

| | | | | |
|---|---|---|---|---|
| 6,064,924 A * | 5/2000 | Fleischmann | ........... | G01S 7/411 701/16 |
| 8,423,487 B1 * | 4/2013 | Rubin | ..................... | G01W 1/00 706/12 |
| 8,456,350 B2 * | 6/2013 | Wood | ..................... | G01S 7/414 342/159 |
| 8,457,813 B2 | 6/2013 | Högström | | |
| 8,554,395 B2 | 10/2013 | Andersson | | |
| 8,600,589 B2 * | 12/2013 | Mendez-Rodriguez | ..................... | G01S 17/89 701/16 |
| 9,568,919 B2 * | 2/2017 | Lim | ..................... | G05D 1/0684 |
| 9,759,809 B2 * | 9/2017 | Derenick | ............. | G05D 1/0684 |
| 9,939,819 B2 * | 4/2018 | Lim | ..................... | G05D 1/0684 |
| 2003/0085807 A1 * | 5/2003 | Gray | ........................ | G08G 3/02 340/511 |
| 2004/0040746 A1 * | 3/2004 | Niedermayr | ............. | E21B 21/08 175/38 |
| 2014/0114509 A1 * | 4/2014 | Venables | .................. | B63B 39/00 701/21 |

(Continued)

FOREIGN PATENT DOCUMENTS

WO WO2008061307 5/2008

*Primary Examiner* — Bao Long T Nguyen
*Assistant Examiner* — Michael A Berns
(74) *Attorney, Agent, or Firm* — Cantor Colburn LLP

(57) ABSTRACT

A method for measuring sea state includes scanning an area of a waterborne moving object over a period of time using at least one sensor to obtain point cloud data of the moving object. The area of the moving object is identified based on the point cloud data. Changes in movement of the area of the moving object are characterized over the period of time based on the point cloud data to calculate a state of the moving object. Sea state is estimated based on the state of the moving object.

18 Claims, 3 Drawing Sheets

(56) References Cited

U.S. PATENT DOCUMENTS

2014/0275886 A1* 9/2014 Teixeira .............. A61B 5/0205
                                                    600/324
2016/0009410 A1   1/2016 Derenick et al.
2017/0267374 A1*  9/2017 Derenick ............. G01C 21/00
2017/0283087 A1* 10/2017 McNeill ................ B64D 45/08

* cited by examiner

300

| | | |
|---|---|---|
| S | *State of the sea* | |
| S' | *State of the water surface in an alighting area* | |
| Code figure | Descriptive terms | Height' in metres |
| 0 | Calm (glassy) | 0 |
| 1 | Calm (rippled) | 0 - 0.1 |
| 2 | Smooth (wavelets) | 0.1 - 0.5 |
| 3 | Slight | 0.5 - 1.25 |
| 4 | Moderate | 1.25 - 2.5 |
| 5 | Rough | 2.5 - 4 |
| 6 | Very rough | 4 - 6 |
| 7 | High | 6 - 9 |
| 8 | Very high | 9 - 14 |
| 9 | Phenomenal | Over 14 |

Notes:

(1) * These values refer to well-developed wind waves of the open sea. While priority shall be given to the descriptive terms, these height values may be used for guidance by the observer when reporting the total state of agitation of the sea resulting from various factors such as wind, swell, currents, angle between sell and wind, etc.

(2) The exact bounding height shall be assigned for the lower code figure: e.g. a height of 4 m is coded as 5.

*World Meteorological Organization sea state guidelines*

*Fig. 3*

SEA STATE ESTIMATION

FIELD

Embodiments herein relate to sensing systems, and more particularly to sensing sea state based on moving objects.

BACKGROUND

Many scenarios involve the detection and tracking of movement of various objects such as ships at sea. For example, data captured over a brief period of time may be evaluated to identify a particular object, such as the deck of a ship, based on various properties of the scene, and the movement of the object through the scene over the time period may be tracked. The information that results can be used, for example, to help land an unmanned aerial vehicle (UAV), an optionally piloted aerial vehicle or a piloted aerial vehicle on a ship deck. However, sea state information may not be readily available since sensors for determining sea state are often not included on ships, and communication issues can occur between ships and aircraft. While some methods of sea state estimation can include the use of buoys and radar, these device may not always be available to provide sea state estimation.

Conventional methods and systems have generally been considered satisfactory for their intended purpose. However, there is still a need in the art for systems and methods that provide for estimation of sea state. The present disclosure provides a solution for this need.

SUMMARY

A method for measuring sea state includes scanning an area of a waterborne moving object over a period of time using at least one sensor to obtain point cloud data of the moving object. The area of the moving object is identified based on the point cloud data. Changes in movement of the area of the moving object are characterized over the period of time based on the point cloud data to calculate a state of the moving object. Sea state is estimated based on the state of the moving object.

At least one of the sensors can include a three dimensional sensor providing point cloud data as a sequential point cloud data stream. The moving object can be a waterborne ship and the area can be a deck of the waterborne ship.

Identifying the area of the moving object can include using at least one of a model fitting algorithm and a template matching algorithm. Characterizing changes in movement of the area can include determining a plurality of states for the area based on dynamics of the area over time relative to a reference point. The reference point can be an aircraft.

Estimating the sea state can include comparing the determined states of the area of the moving object to a behavior profile stored in a database. The sea state can be categorized based on the behavior profile.

The area of the moving object can be continuously scanned and a dynamic feedback module can be updated with point cloud data to continuously track the moving object.

The estimated sea state can be transmitted to one or more waterborne ships, one or more aircrafts or combinations thereof.

A system for determining ship deck landing feasibility includes at least one sensor, and a processor operatively connected to the at least one sensor, the processor configured to perform machine readable instructions that cause the system to scan an area of a waterborne moving object over a period of time using at least one sensor to obtain point cloud data of the moving object, identify the area of the moving object based on the point cloud data, characterize changes in movement of the area of the moving object over the period of time based on the point cloud data to calculate a state of the moving object, and estimate sea state based on the state of the moving object.

The aircraft can be an unmanned aircraft using the processor to automatically control the aircraft to land on a deck of the waterborne ship in accordance with a generated landing trajectory. The system can also include a communication device, such that the processor instructs the communication device to transmit the estimated sea state to at least one of an aircraft and a waterborne ship.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures.

FIG. 3 shows exemplary categories of sea states measured by embodiments herein.

DETAILED DESCRIPTION

Figure 1:
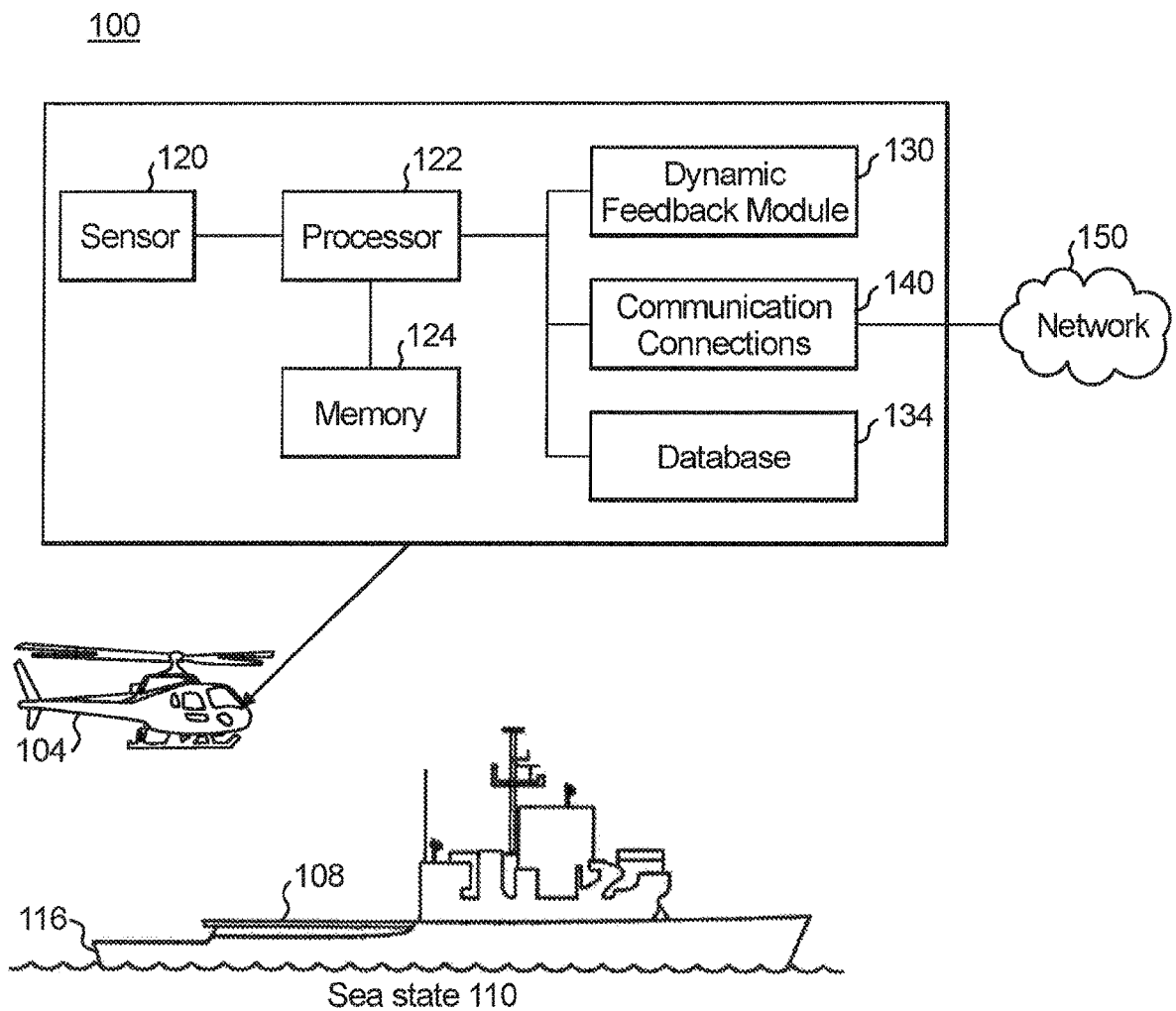
FIG. 1 is a schematic view of an exemplary embodiment of a system for estimating and/or tracking sea state constructed in accordance with the present disclosure, showing the system incorporated in an aircraft.

Reference will now be made to the drawings wherein like reference numerals identify similar structural features or aspects of the subject disclosure. For purposes of explanation and illustration, and not limitation, a partial view of an exemplary embodiment of a method and system for imaging a moving object in accordance with the disclosure is shown in FIG. 1 and is designated generally by reference character 100. Other embodiments of the system and method in accordance with the disclosure, or aspects thereof, are provided in FIGS. 2-4, as will be described. Systems and methods described herein can be used for estimating and/or tracking sea state using laser imaging (LIDAR) or other three dimensional sensing system.

Many scenarios involve an automated evaluation of information related to an area, such as a deck of a waterborne ship, to detect the presence and circumstances/environment of moving objects and identify the position, size, orientation, velocity, and/or acceleration of the moving objects. With reference to FIG. 1, one exemplary embodiment can include determining a sea state 110 around a waterborne ship 116 so as to guide an aircraft 104 onto a deck 108 of the waterborne ship 116. The analysis may be done in realtime or near-realtime and may involve the capturing of point cloud data. Those skilled in the art will readily appreciate that the system and method described herein are suitable for various other applications wherein detection and tracking of a moving object may be useful.

The system 100 of FIG. 1 for imaging a moving object and measuring a sea state around the moving object is shown. The system 100 is shown operatively connected to the aircraft 104. However, it will be understood that the system 100 can be integrated into aircraft 104 or remotely connected to the aircraft 104 via network 150. The system 100 includes one or more sensors 120 operatively connected to a processor 122 connected to a memory 124. The one or more sensors 120 can include a LIDAR capturing device, which emits a set of focused, low-power beams of light of a specified wavelength that detects and records the reflection of wavelengths of light from various objects. The LIDAR data can be used to generate a LIDAR point cloud, representing the LIDAR points of light reflected from the object. By capturing and evaluating LIDAR point data over a set time period, a representation of the relative position of a moving object (e.g., ship 116) can be found. The period of time may be predetermined or determined in realtime, either automatically by an algorithm implemented by the processor or set manually by a user.

The system 100 and method 200 (shown in FIG. 2) described herein can be used to capture point clouds of the moving object and/or an area of the moving object (e.g., a ship deck) over a period of time and determine sea state 110 based on the point cloud data from the LIDAR sensors. The system 100 further includes a dynamic feedback module 130 and a database 134. Database 134 may include behavior profiles for different sizes/scales of ships, for example, previously recorded data on ship behavior under different sea states and sea conditions. A correlation between ship behavior and sea state can be made based on the behavior profiles stored in database 134. Communication connections 140 may be included in the system 100, for example, a modem, an integrated network interface, a radio interface, or the like. Communication connections 140 may also include a wired or wireless communication to transmit and receive communication. For example, as shown, communication connections 140 may be connected to a network 150 and thus be operated remotely, for example, in UAVs. Network 150 may be a communication link comprising an internet connection, Ethernet link, local area link, cellular link, satellite link, global system for mobile communication (GSM), etc. Those skilled in the art will recognize that system may include additional features and/or functionality not shown and described without departing from the scope of the present disclosure.

Figure 2:
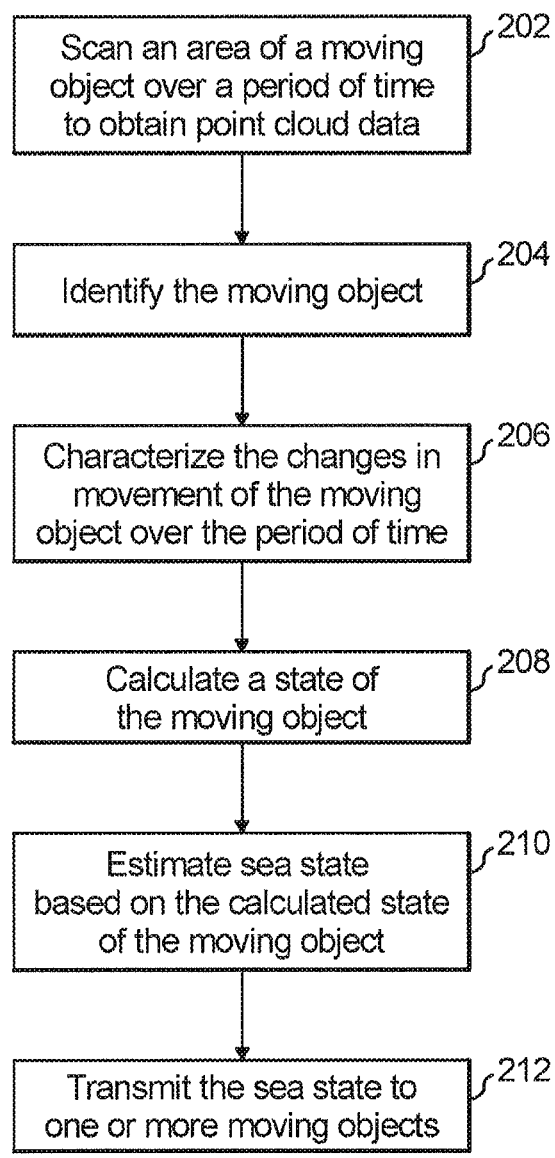
FIG. 2 is a flow chart showing method steps of employing the system of FIG. 1.

With reference to FIG. 2, the method 200 may be implemented, e.g., as a set of instructions stored in the memory 124 of the system 100 that, when executed by the processor 122, cause the processor to operate according to the steps herein. The method 200 begins at step 202 by executing the instructions on the processor, e.g., processor 122, and requesting a LIDAR scan from one or more sensors, e.g., sensor 120, of an area of a moving object, e.g., a shipdeck 108, to obtain point cloud data over a period of time so as to extract a sequence of ship state estimates relative to a reference point, such as aircraft 104. The LIDAR point cloud data may be provide as data streams that are discretized as appropriate via one or more algorithms implemented by processor 122 such that points are collected from the LIDAR data streams and images are generated accordingly. Then at step 204, point cloud data of the moving object captured using the sensor 120 (e.g., LIDAR sensor) is used to identify, locate, and/or estimate an area of the moving object, such as the deck surface of the ship. Identification may be performed using a model fitting algorithm such as RANSAC-based plane fitting, and/or template matching.

Once the area of the moving object is identified, the point cloud data is used to estimate rates of motion of the area over time. At step 206, changes in movement of the moving object are characterized over the period of time based on changes calculated from the captured point cloud data, which may also be captured point cloud images in certain embodiments.

Then in step 208, based on the changes in movement detected and/or calculated, the state of the moving object can be determined, and appropriate calculations may be employed to solve for roll, pitch, and/or yaw. Embodiments herein use LIDAR to fit a plane to an area, such as a deck surface, and evaluate the behavior of that plane model to determine ship state. Notably, determination of ship state is found relative to the aircraft 104 itself. The roll, pitch, and/or yaw may then be calculated once those measurements are determined and constrained. A sequence of ship state estimates can be useful for determining the behavior of the ship over time (e.g., how it is subject to sea state over time). In other words, ship state estimation in various embodiments herein uses an aircraft as a frame of reference, and infers the sea state based on the calculated ship state over time. In estimating ship state, embodiments herein determine the x, y location of the ship deck centroid (latitude, longitude), a height of the centroid of the deck, yaw of the deck, and roll and pitch, as well as an estimation for rate of change of latitude and longitude (x, y velocity).

At step 210, sea state can be estimated based on the state of the moving object. That is, sea state 110 can be inferred from a ship and/or ship deck's state estimate and behavior over time. The motion of the moving object can be compared against one or more behavior profiles stored in a database (e.g., database 134). The behavior profile(s) may include historical data previously record for the moving object under various conditions/sea states. For example, the behavior profile may include details of how a ship/ship deck behaves in a given sea state. The estimation of the ship's dynamics enables reasonable extrapolation about the sea state around the ship. As such, the dynamics of the water can be characterized based on the dynamics of the ship, and mapping this characterization to a hypothesized sea state.

For example, various embodiments herein compare the numerical ship state estimates with other known ranges of ship states of vessels subject to different sea states. That is, the numerical characterization of a ship's behavior and dynamics would be compared with other known ship behaviors that had been observed under various sea states and correlated with the sea states (e.g., data from behavioral profiles stored in database 134). As it is to be expected that ships of different size would behave differently under a given sea state, these differences in behavior of different-sized vessels could be grouped and the state of the vessel of interest can be compared accordingly. A general classification of the ship of interest, e.g., based on size, could be made and its dynamics/behavior interpreted accordingly when correlating its ship state with a sea state.

Optionally, at step 212, the estimated sea state can be transmitted to one or more aircrafts and/or one or more ships. The one or more aircrafts may be unpiloted, optionally piloted or piloted; the estimated sea state may provide insight on safety and feasibility of landing, especially in visually degraded environments.

FIG. 3 shows an illustrative set of sea states according to the World Meteorological Organization sea state guidelines. Embodiments described herein may categorize the sea state based on the dynamics of the ship into one of the sea states shown in sea state table 300. As shown, sea state may be rated from 0 to 9. The rating of the sea state may depend on factors such as wave height, sea swell, and wind, which may lead to variations in sea states. For example, a sea state of zero may be indicative of a calm sea surface and a sea state of nine may be indicative of phenomenal sea surface having waves over 14 meters in height. It is to be appreciated that other scales/metrics may be used to characterize the sea state.

In an illustrative example of the system 100 implementing methodology 200, a waterborne ship 116 is moving/rolling with the waves of the ocean. Point cloud data of the ship 116 and/or ship deck 108 are captured over a period of time using one or more LIDAR sensors 120 mounted on an UAV 104 approaching the ship 116. The point cloud data stream is then used to characterize the ship's behavior and dynamics over time to determine a sequence of ship states. Estimation of the dynamics of the ship (e.g., speed, altitude, position, etc.) can be determined based on the variation of movement of the ship in the sequence of point cloud data images in the point cloud data stream received over time. The ship states may be numerical values which are compared to known ship behaviors stored as behavior profiles in a database 134. After finding a full state estimation for the ship 116, an estimate of sea state 110 can be extrapolated. The sea state 110 can be categorized into one of several sea states. For example, as shown in FIG. 3, the sea state can be rated on a scale of 0 to 9. Using embodiments herein, the behavior of the ship 116 as represented by the ship state will reflect sea state 110, and ship state can be mapped to a likely sea state. Then, optionally, the sea state 110 can be transmitted via communication connections 140 to one or more ships, including ship 116 and/or aircrafts to notify them of the state of the waters around the ship 116.

In various embodiments, the LIDAR sensor 120 can continuously scan the moving object 116. The scans received are inputted into a dynamics feedback module, e.g., dynamics feedback module 130 and are used to continuously track the movement of the moving object 116 and/or sea state 110, for various applications, including calculating a landing trajectory or a time window for safe landing for aircraft 104. For example, the processor can measure the pitch rate or roll rate of the waterborne ship and can determine x,y,z coordinates for calculating a suitable landing trajectory. Using LIDAR allows the system to accurately create a model of the moving object at any other suitable distance, e.g., 2500 feet (760 meters), thereby allowing for control and adjustments while nearing the ship.

Advantageously, embodiments described herein require no special equipment on a ship and makes no assumptions about the availability of additional information; the sensor packages mounted on the aircraft are sufficient. Estimation of sea state is valuable in many cases, such as for an unmanned aircraft when determining the feasibility of landing, or for a piloted/optionally piloted-landing, were there to be no communicated information about sea state or under visually-degraded conditions. Additionally, this capability could be useful outside of the scope of landing, efficiently providing sea state information to mariners or authorities.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "device," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is intended to provide a brief, general description of an illustrative and/or suitable exemplary environment in which embodiments of the above described present invention may be implemented. FIG. 1 is exemplary of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The methods and systems of the present disclosure, as described above and shown in the drawings, provide for measuring sea state based on the dynamics of a moving object. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of measuring sea state by an aircraft, comprising:
    scanning, by the aircraft comprising at least one sensor coupled to a processor, an area of a waterborne moving object over a period of time using the at least one sensor to obtain point cloud data of the moving object;
    identifying, by the aircraft comprising the processor, the area of the moving object based on the point cloud data;
    characterizing, by the aircraft comprising the processor, changes in movement of the area of the moving object over the period of time based on the point cloud data to calculate a state of the moving object; and
    estimating a rating of a sea state, by the aircraft comprising the processor, based on the state of the moving object, the sea state comprising dynamics of water in proximity to the moving object, the estimated rating of the sea state and the state of the moving object allowing for adjustments to the aircraft.

2. The method of claim 1, wherein the moving object is a waterborne ship and the area is a deck of the waterborne ship.

3. The method of claim 1, wherein the at least one sensor includes a three dimensional sensor providing the point cloud data as a sequential point cloud data stream.

4. The method of claim 3, wherein identifying the area of the moving object includes using at least one of a model fitting algorithm and a template matching algorithm.

5. The method of claim 4, wherein characterizing changes in movement of the area includes determining a plurality of states for the area based on dynamics of the area over time relative to a reference point.

6. The method of claim 5, wherein the reference point is the aircraft.

7. The method of claim 6, wherein estimating the rating of the sea state includes comparing the determined states of the area of the moving object to a behavior profile stored in a database.

8. The method of claim 7, further including categorizing the sea state based on the behavior profile.

9. The method of claim 1, further comprising continuously scanning the area of the moving object and updating a dynamic feedback module with the point cloud data to continuously track the moving object.

10. The method of claim 1, further comprising transmitting the estimated rating of the sea state to one or more waterborne ships, one or more aircrafts or combinations thereof.

11. The method of claim 1, wherein the estimated rating of the sea state is based on at least one or more of a wave height, a sea swell, and wind.

12. The method of claim 1, wherein the estimated rating of the sea state comprises levels from a low level to a high level.

13. The method of claim 1, wherein estimating the rating of the sea state by the aircraft comprises using the aircraft as a frame of reference.

14. A system of an aircraft for determining ship deck landing feasibility, comprising:
    at least one sensor; and
    a processor operatively connected to the at least one sensor of the aircraft, the processor configured to perform machine readable instructions that cause the system to:
    scan an area of a waterborne moving object over a period of time using the at least one sensor to obtain point cloud data of the moving object;
    identify the area of the moving object based on the point cloud data;
    characterize changes in movement of the area of the moving object over the period of time based on the point cloud data to calculate a state of the moving object; and
    estimate a rating of a sea state, by the aircraft comprising the processor, based on the state of the moving object, the sea state comprising dynamics of water in proximity to the moving object, the estimated rating of the sea state and the state of the moving object allowing for adjustments to the aircraft.

15. The system of claim 14, wherein the at least one sensor includes a three dimensional sensor providing the point cloud data as a sequential point cloud data stream.

16. The system of claim 14, wherein the at least one sensor uses laser imaging.

17. The system of claim 16, wherein the aircraft is one of an unmanned aircraft, an optionally piloted and a piloted aircraft providing insight on safety and feasibility of landing using the processor to automatically control the aircraft to land on a deck of the moving object in accordance with a generated landing trajectory.

18. The system of claim 14, further comprising a communication device, wherein the processor instructs the communication device to transmit the estimated rating of the sea state to one or more aircrafts, one or more waterborne ships or combinations thereof.

* * * * *